(12) United States Patent
Tashiro et al.

(10) Patent No.: US 11,462,896 B2
(45) Date of Patent: Oct. 4, 2022

(54) ELECTRICAL CONNECTION BOX

(71) Applicant: Yazaki Corporation, Tokyo (JP)

(72) Inventors: Hiroki Tashiro, Shizuoka (JP);
Ryouichi Yokoyama, Shizuoka (JP);
Takuma Kaneko, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 174 days.

(21) Appl. No.: 17/133,644

(22) Filed: Dec. 24, 2020

(65) Prior Publication Data

US 2021/0218235 A1 Jul. 15, 2021

(30) Foreign Application Priority Data

Jan. 14, 2020 (JP) .............................. JP2020-003531

(51) Int. Cl.
*H02G 3/14* (2006.01)
*H02G 3/08* (2006.01)
*B60R 16/033* (2006.01)

(52) U.S. Cl.
CPC .............. *H02G 3/14* (2013.01); *H02G 3/083* (2013.01); *B60R 16/033* (2013.01)

(58) Field of Classification Search
CPC ........ H02G 3/08; H02G 3/0691; H02G 15/16; H02G 3/086; H02G 3/00
See application file for complete search history.

(56) References Cited

U.S. PATENT DOCUMENTS

| | | | | |
|---|---|---|---|---|
| 5,788,530 | A * | 8/1998 | Kasai ..................... | H02G 3/14 439/372 |
| 5,897,392 | A * | 4/1999 | Takahashi .......... | H01R 13/5804 439/470 |
| 5,971,796 | A * | 10/1999 | Duhr .................... | H01R 13/516 439/445 |
| 6,822,163 | B2 * | 11/2004 | Saneto ............... | B60R 16/0239 174/59 |
| 2004/0029420 | A1* | 2/2004 | Yamaguchi .......... | H01R 9/2466 439/76.2 |
| 2007/0049090 | A1* | 3/2007 | Kaneko ............... | B60R 16/0239 439/271 |
| 2007/0123114 | A1* | 5/2007 | Egawa ..................... | H01R 9/24 439/752 |

(Continued)

FOREIGN PATENT DOCUMENTS

JP 2012-165483 A 8/2012

*Primary Examiner* — Krystal Robinson
(74) *Attorney, Agent, or Firm* — Kenealy Vaidya LLP

(57) ABSTRACT

An electrical connection box includes a casing and a cover member. The cover member includes: a cover-member main body; a restriction piece arranged along an arrangement direction with respect to a pair of locking pieces; and a rigid part that is disposed with a space provided with respect to the cover-member main body in an orthogonal direction and is extended toward the orthogonal direction. The casing includes: a pair of restriction reception parts opposing to respective ends in the arrangement direction of a pair of the restriction pieces in a state in which the cover member is fitted to the casing; and a rigid reception part having a rigid-reception-part projecting wall part located between the rigid part and the cover-member main body in a state in which the rigid part is inserted and the cover member is fitted to the casing.

16 Claims, 13 Drawing Sheets

(56) References Cited

U.S. PATENT DOCUMENTS

| | | | |
|---|---|---|---|
| 2009/0221160 A1* | 9/2009 | Taniguchi | H02G 3/083 439/76.2 |
| 2013/0017012 A1* | 1/2013 | Kawamura | H02G 3/0625 403/291 |
| 2017/0070040 A1* | 3/2017 | Kawada | B60R 16/0238 |
| 2018/0263128 A1* | 9/2018 | Nakano | H02G 3/16 |
| 2018/0309279 A1* | 10/2018 | Kakimi | H02G 3/088 |
| 2020/0068732 A1* | 2/2020 | Tashiro | H05K 5/03 |

* cited by examiner

ELECTRICAL CONNECTION BOX

CROSS-REFERENCE TO RELATED APPLICATION(S)

The present application claims priority to and incorporates by reference the entire contents of Japanese Patent Application No. 2020-003531 filed in Japan on Jan. 14, 2020.

BACKGROUND OF THE INVENTION

1. Field of the Invention

The present invention relates to an electrical connection box.

2. Description of the Related Art

An electrical connection box loaded on a vehicle collectively houses electric components such as a connector, a fuse, a relay, a capacitor, and the like in an inside housing space. Among such electrical connection boxes, there is a type that includes a cover member for holding a wiring member that is electrically connected to the electric components (for example, Japanese Patent Application Laid-open No. 2012-165483).

However, due to an external force working on the cover member at the time of transporting such electrical connection box, a large force may be applied to the cover member. Furthermore, due to a large force applied to the cover member, a part of the cover member may be deformed excessively. Therefore, with the conventional electrical connection box, there is still room for improvement in regards to deformation caused in a part of the cover member.

SUMMARY OF THE INVENTION

The present invention is designed in view of the foregoing circumstances, and it is an object thereof to provide an electrical connection box capable of suppressing excessive deformation caused in a part of the cover member.

In order to achieve the above mentioned object, an electrical connection box according to one aspect of the present invention includes a casing having a housing space inside for housing an electronic component; and a cover member that includes a wiring member holding part for holding a wiring member electrically connected to the electronic component, the cover member being fitted to the casing by being moved to a fitting direction with respect to the casing, wherein the cover member includes: a cover-member main body; at least one locking piece extended from the cover-member main body toward the fitting direction; a restriction piece that is extended from the cover-member main body toward the fitting direction, and is arranged along the locking piece in an arrangement direction orthogonal to the fitting direction; a plate part located in a midway of the fitting direction of the cover-member main body; and a rigid part that projects from the plate part toward the fitting direction, is disposed with a space provided with respect to the cover-member main body in an orthogonal direction orthogonal to each of the fitting direction and the arrangement direction, and is extended in the orthogonal direction, the casing includes: an insertion hole to which the wiring member is inserted; a locking reception part to which the locking piece is inserted; a pair of restriction reception parts that oppose to respective ends in the arrangement direction of a pair of the restriction pieces in a state in which the cover member is fitted to the casing; and a rigid reception part having a rigid-reception-part projecting wall part located between the rigid part and the cover-member main body in a state in which the rigid part is inserted and projects from the casing toward an opposite direction of the fitting direction, and the cover member is fitted to the casing.

According to another aspect of the present invention, in the electrical connection box, it is possible to configure that the rigid part is formed in a wedge shape in which a part neighboring to the plate part is thickest and becomes thinner toward a tip side that is inserted into the rigid reception part, and in the rigid reception part, a space part to which the rigid part is inserted is formed in a wedge shape.

According to still another aspect of the present invention, in the electrical connection box, it is possible to configure that the casing includes: a casing main body having an opening opened toward a downward direction that is an opposite direction of the fitting direction; and a bottom body that closes the opening, and the cover member projects from the bottom body toward the downward direction.

According to still another aspect of the present invention, in the electrical connection box, it is possible to configure that the casing includes: a pair of the locking pieces are provided to the cover member to sandwich the restriction piece in the arrangement direction, a pair of the locking reception parts are provided to the casing, and the pair of restriction reception parts are the pair of locking reception parts.

According to still another aspect of the present invention, in the electrical connection box, it is possible to configure that the cover-member main body includes a pair of the parts sandwiching the wiring member holding part in the arrangement direction, and the casing includes a pair of the rigid reception parts sandwiching the wiring member holding part in a state in which the cover member is fitted.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Hereinafter, an embodiment of an electrical connection box 1 according to the present invention will be described by referring to the accompanying drawings. Note that the present invention is not limited by the embodiment. Furthermore, structural elements in the following embodiment include elements that may be replaceable by and may easily occur to those skilled in the art or elements that are substantially the same.

Figure 1:
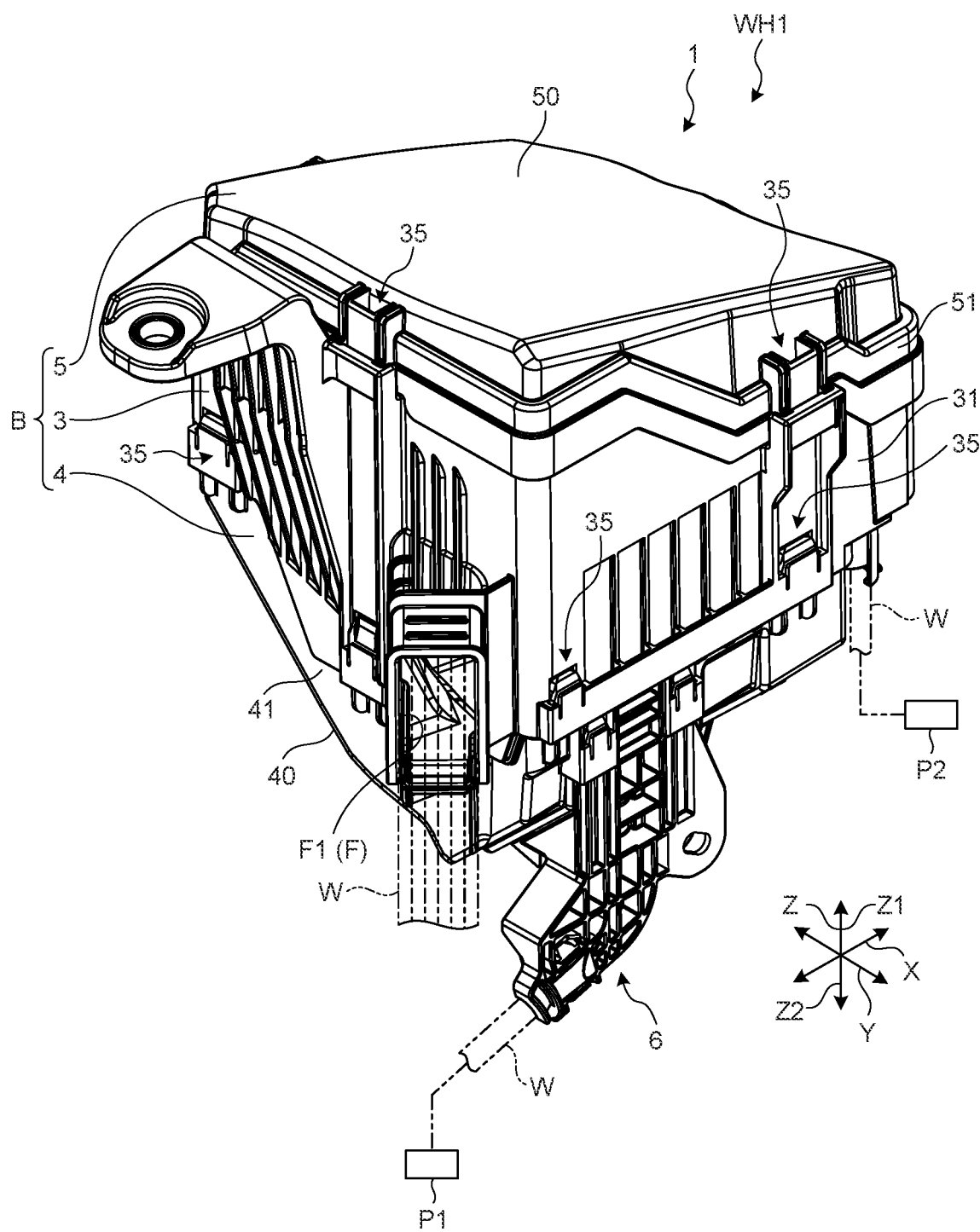
FIG. 1 is a perspective view illustrating an electrical connection box according to an embodiment.
Figure 2:
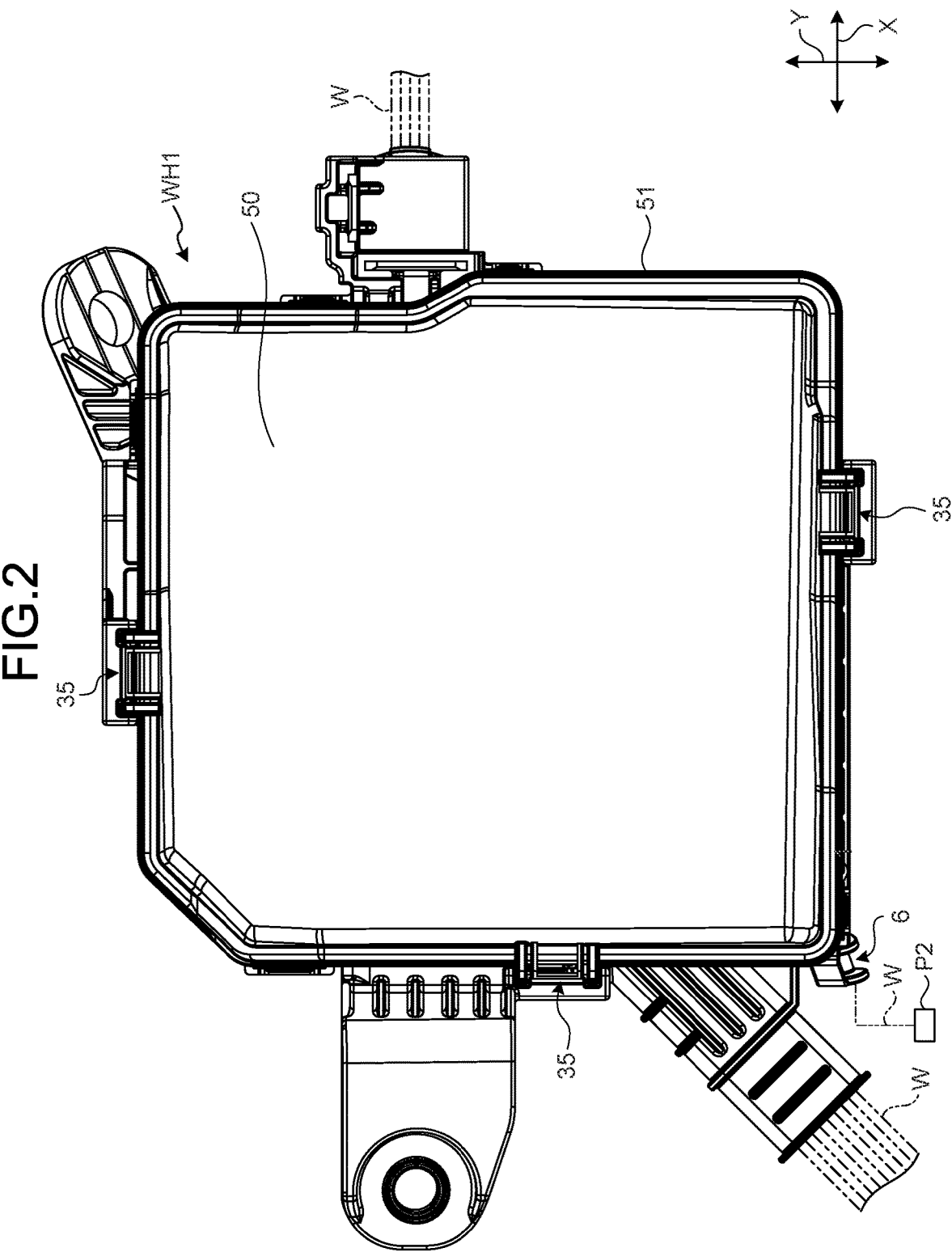
FIG. 2 is a plan view illustrating the electrical connection box according to the embodiment.
Figure 3:
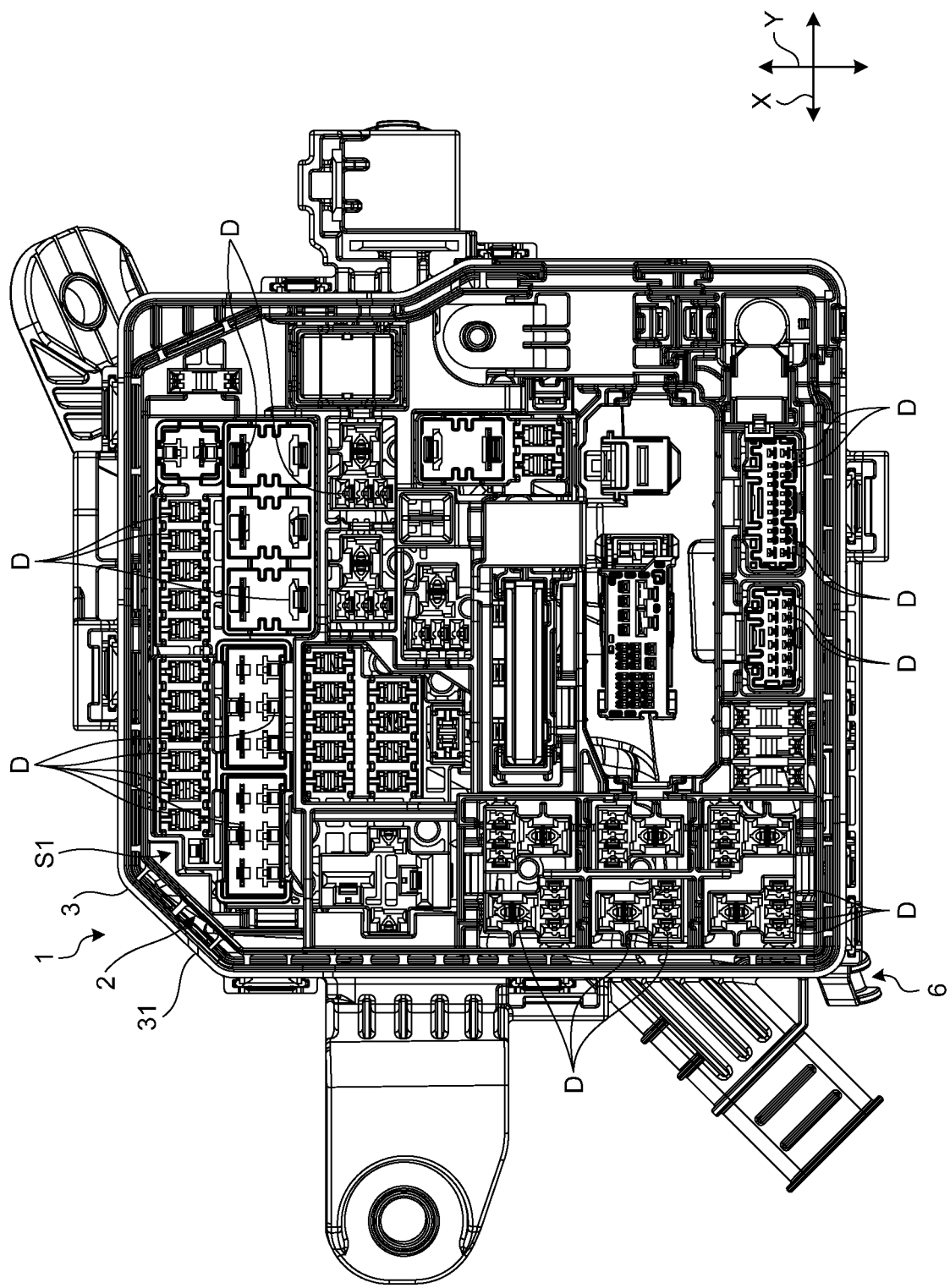
FIG. 3 is a plan view illustrating a casing main body of the electrical connection box according to the embodiment in a state in which a lid member is removed from the casing main body.
Figure 4:
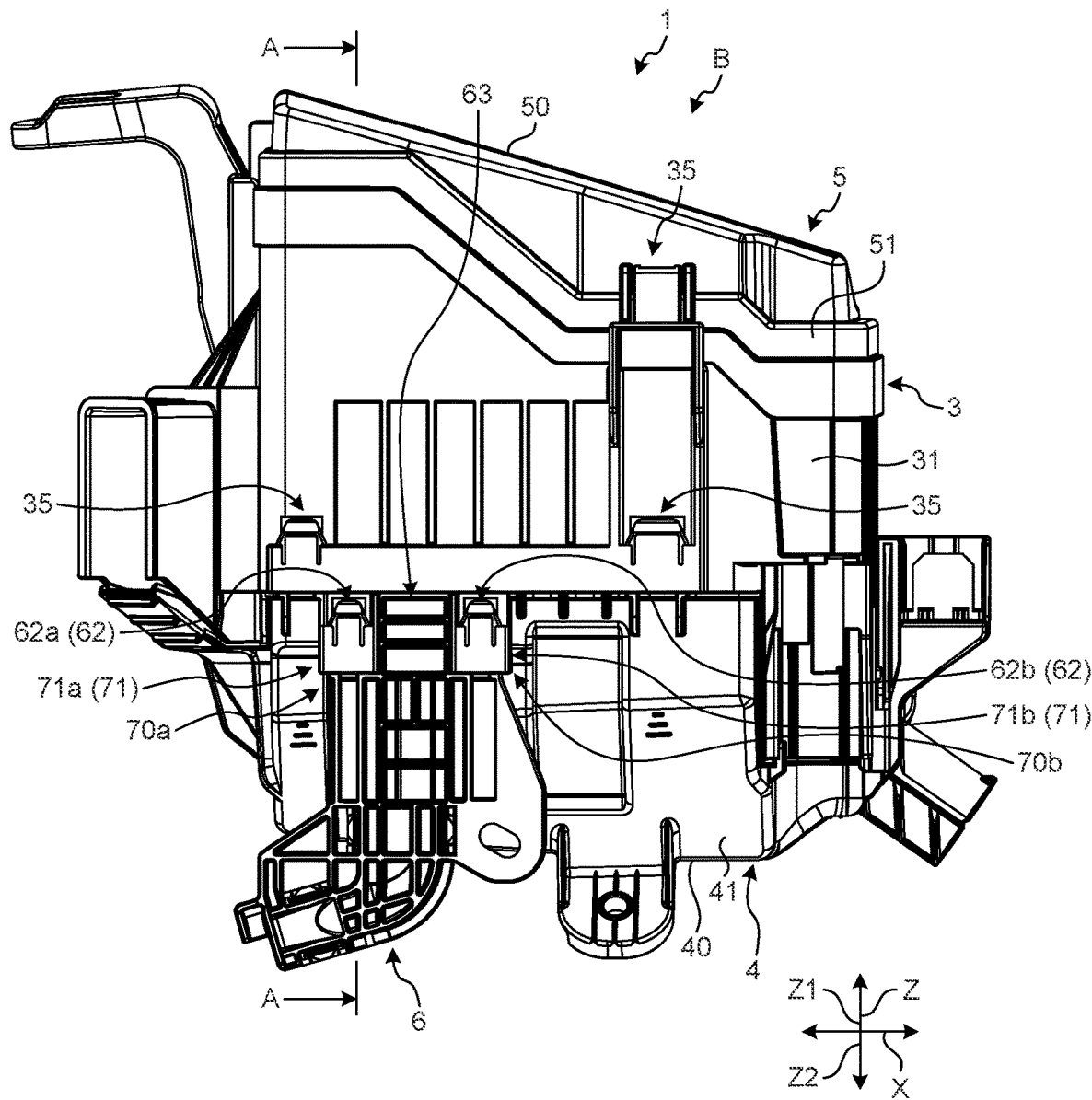
FIG. 4 is a side view of the electrical connection box according to the embodiment.
Figure 5:
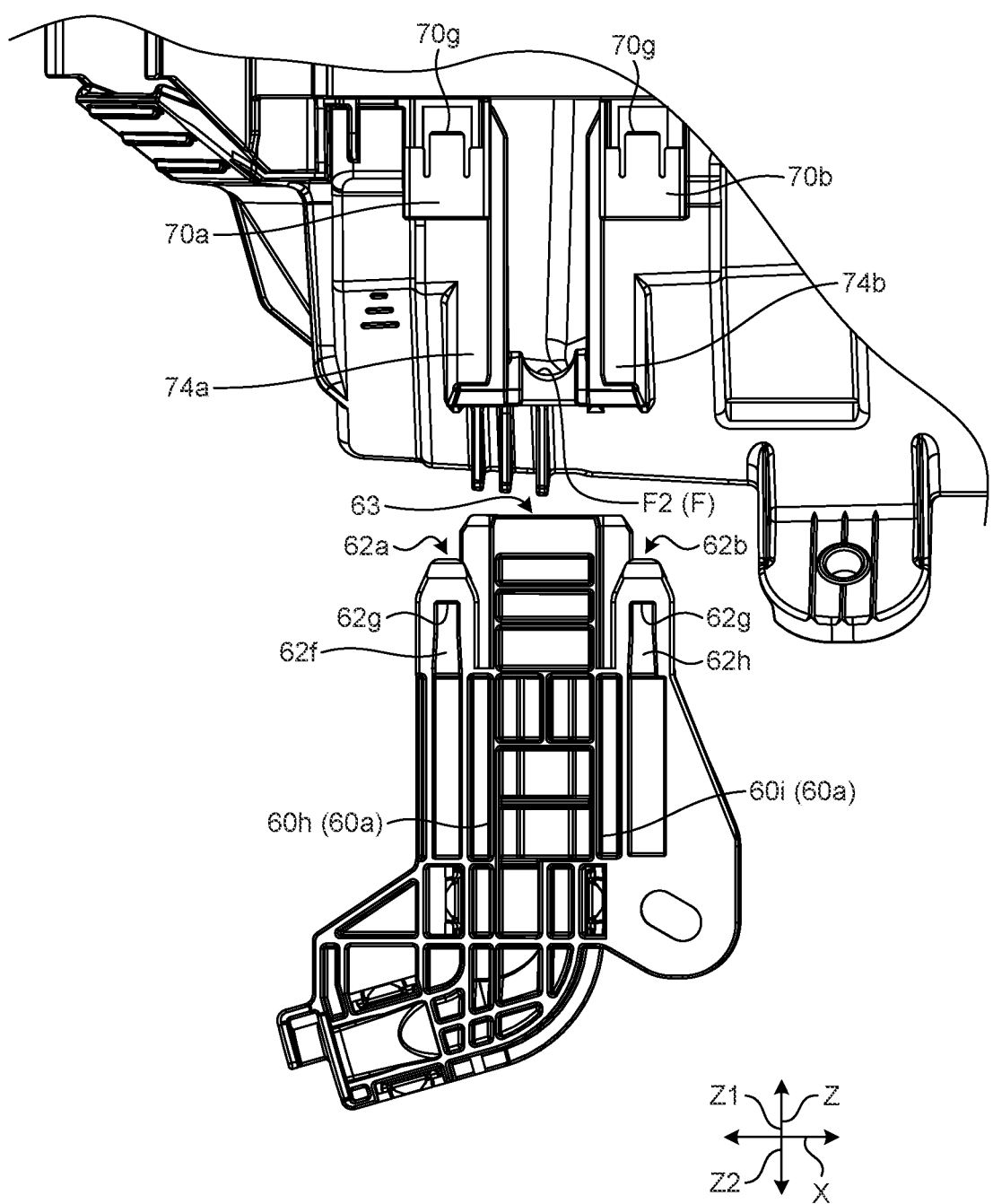
FIG. 5 is a side view of the electrical connection box according to the embodiment in a state in which a cover member is removed from a base body.
Figure 6:
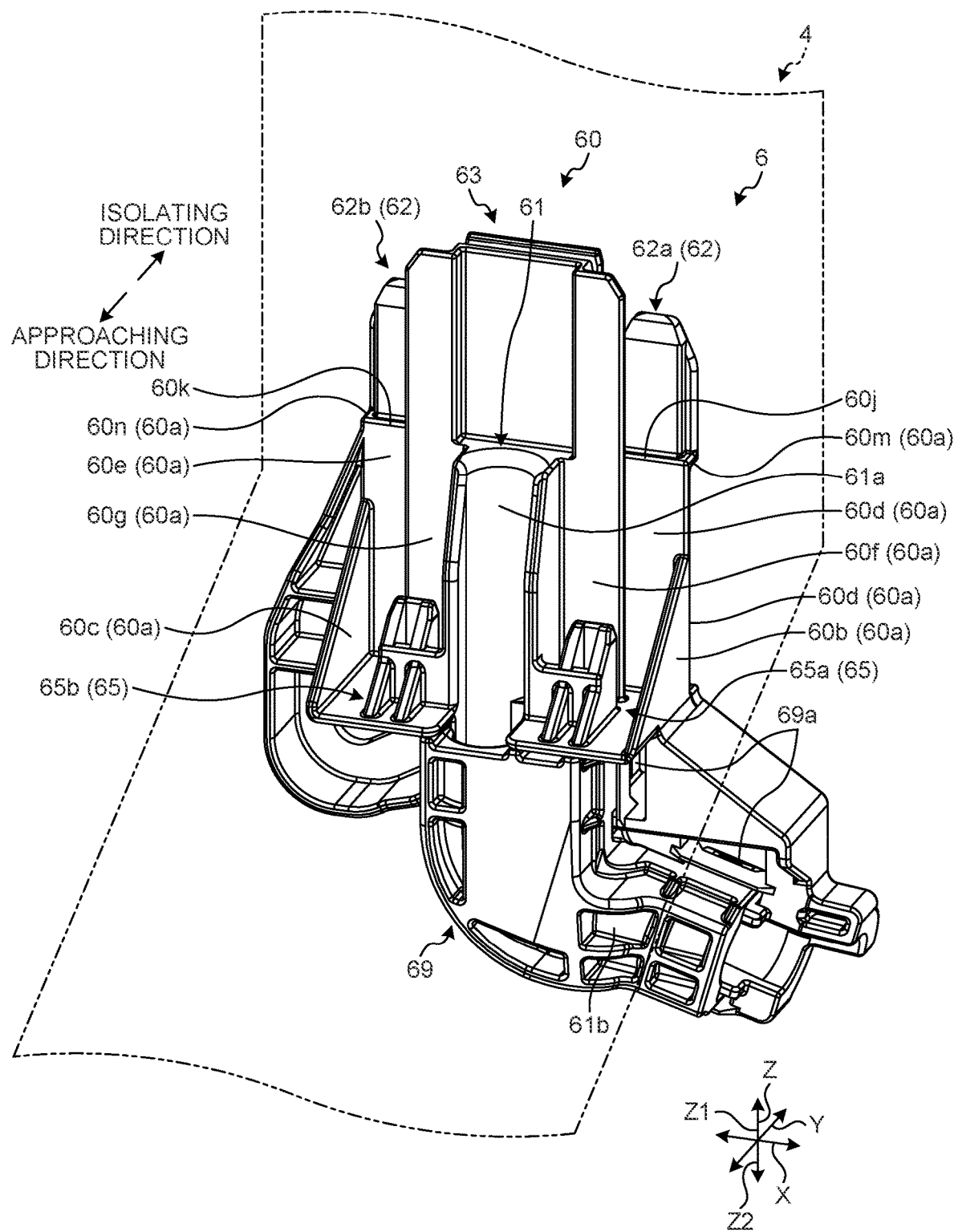
FIG. 6 is a perspective view of the cover member according to the embodiment.
Figure 7:
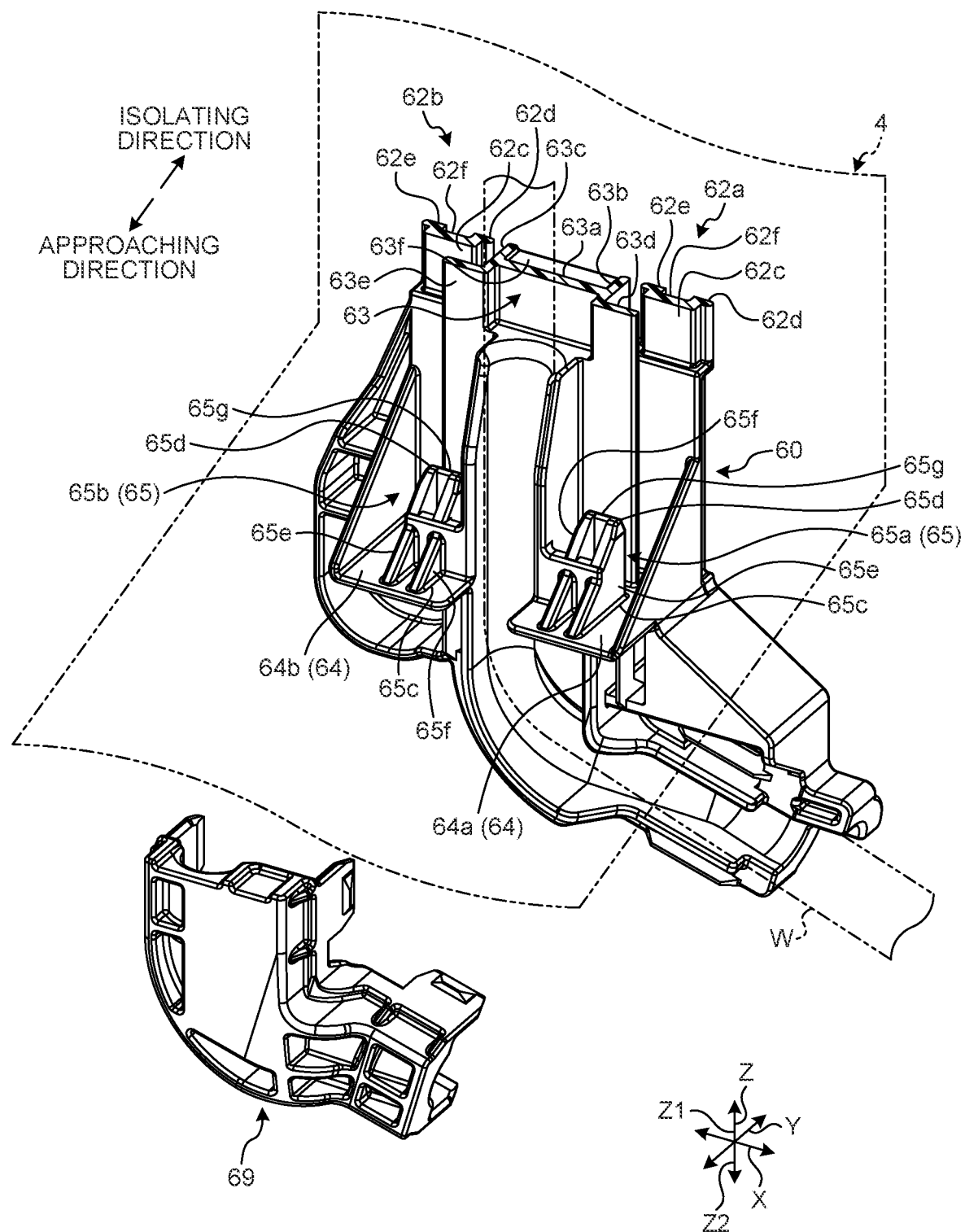
FIG. 7 is a partial sectional view of the cover member according to the embodiment in a state in which a lid part is removed from a cover-member main body.
Figure 8:
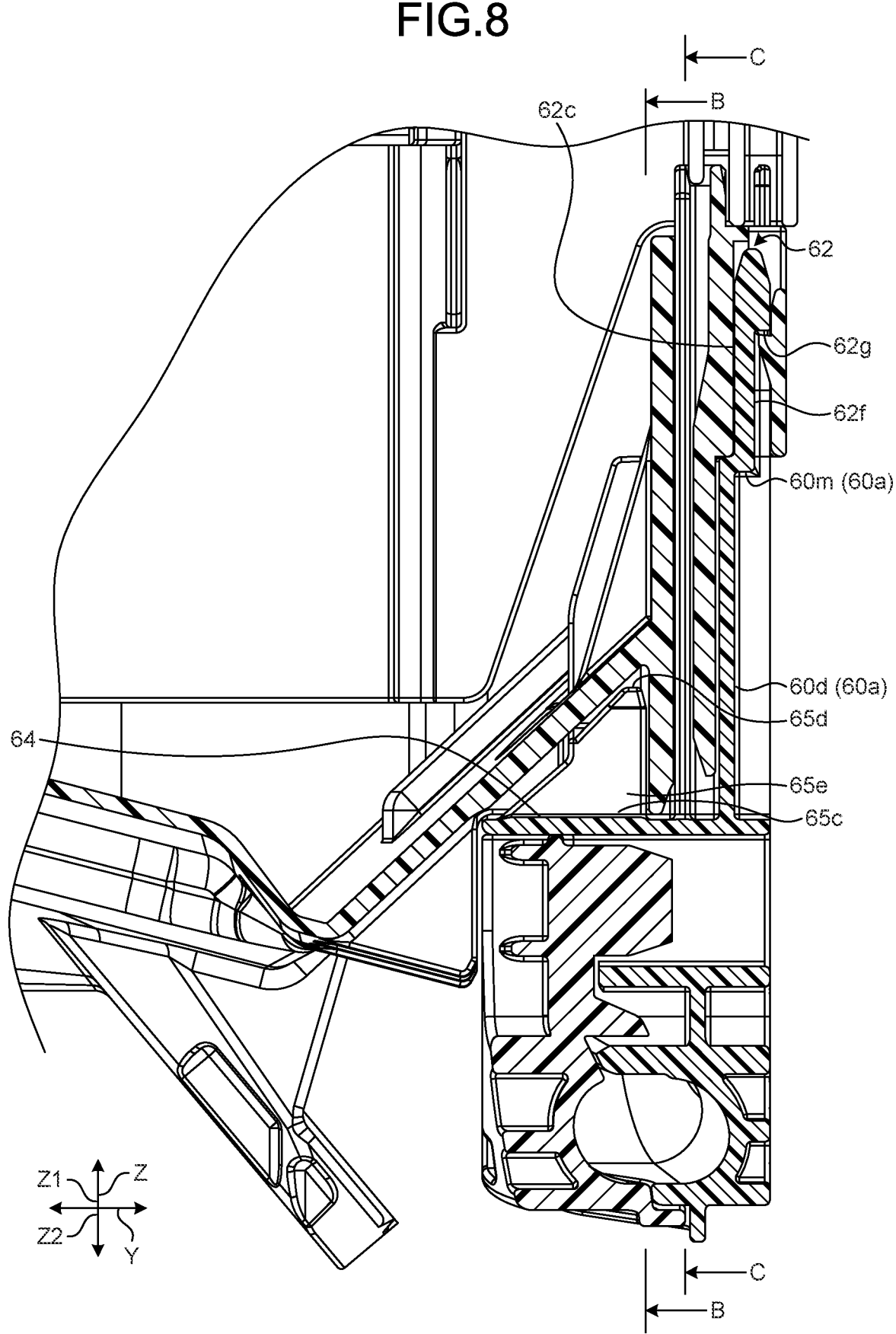
FIG. 8 is a sectional view taken along a line A-A in FIG. 4.
Figure 9:
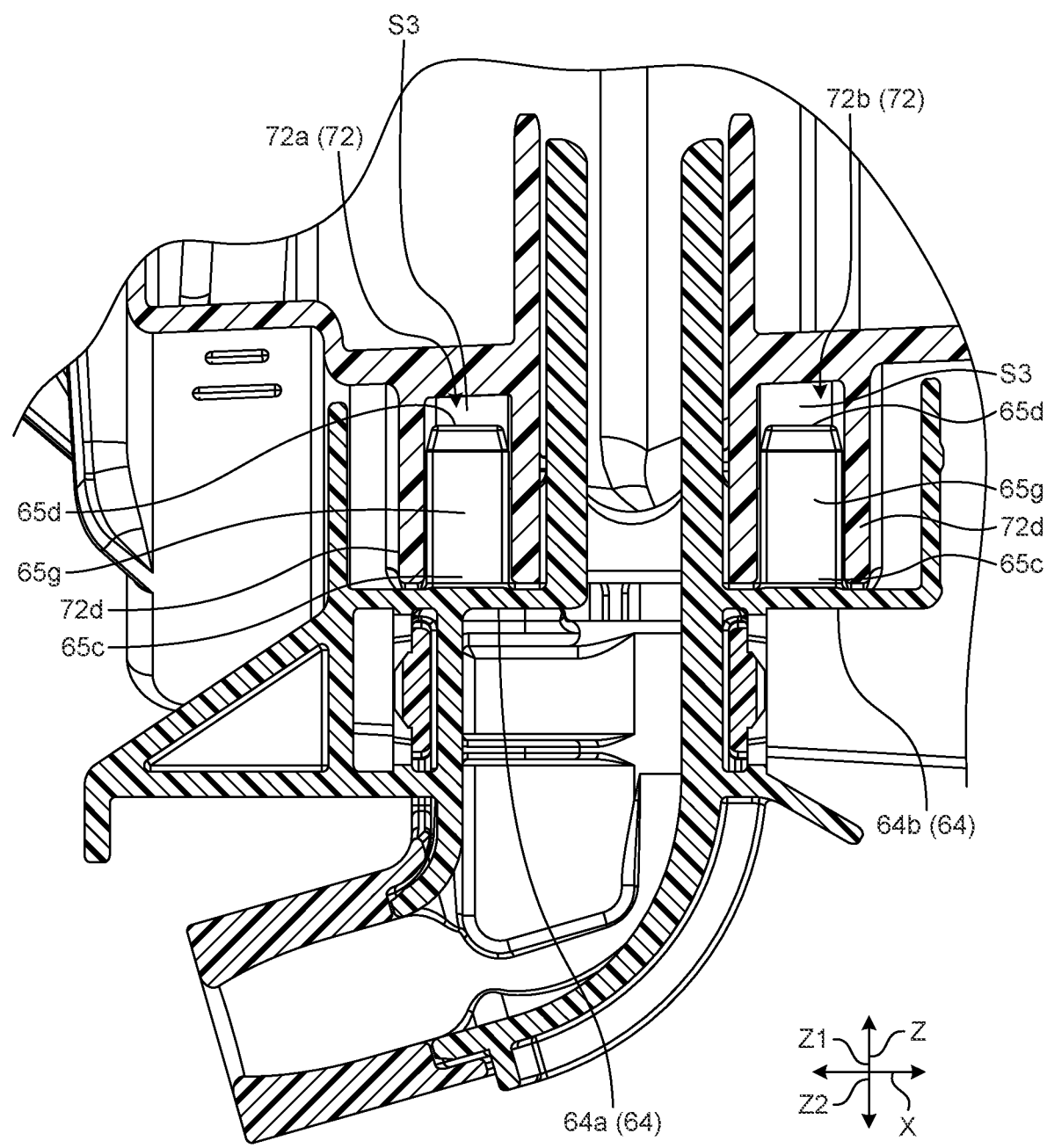
FIG. 9 is a sectional view taken along a line B-B in FIG. 8.
Figure 10:
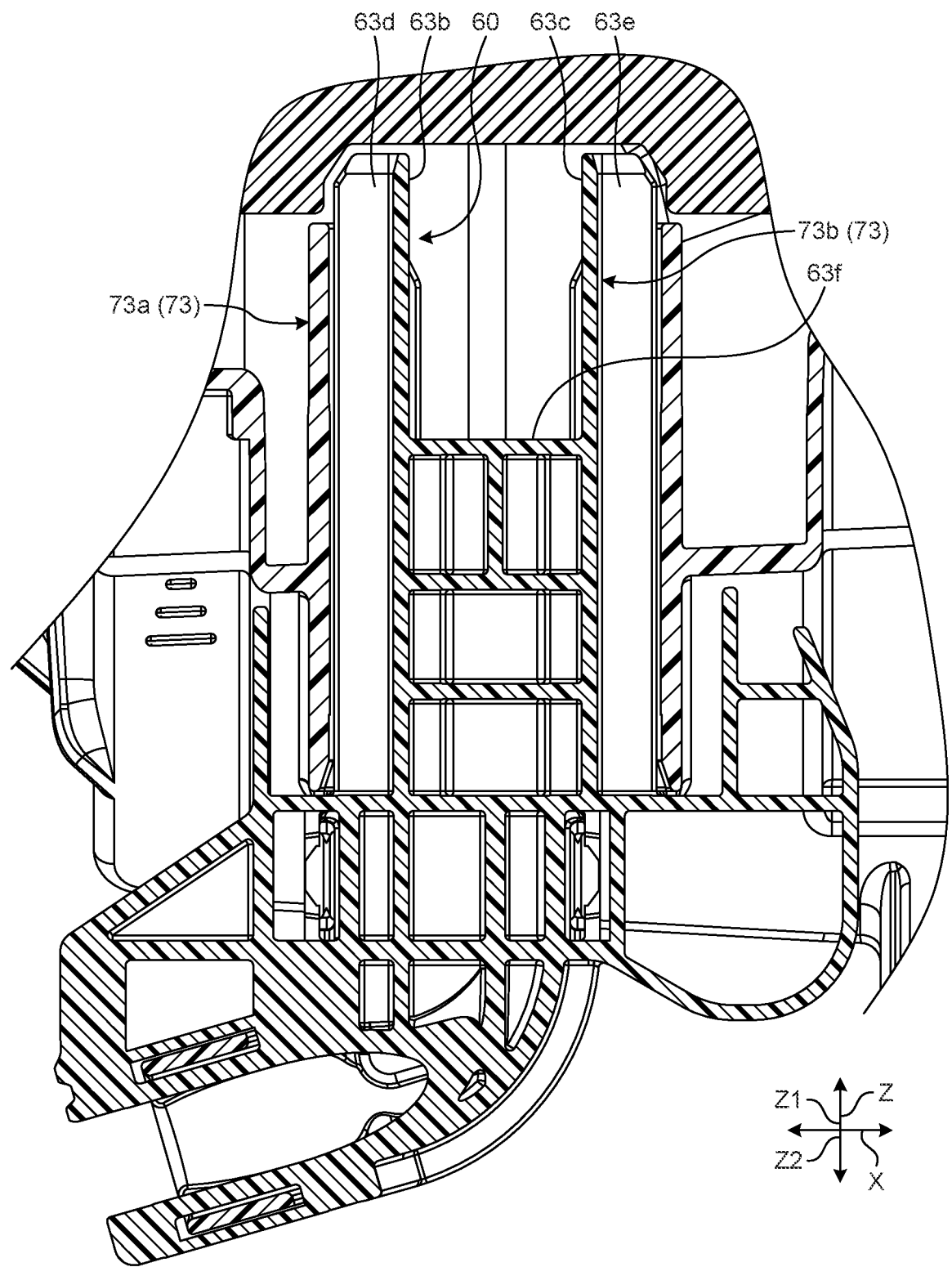
FIG. 10 is a sectional view taken along a line C-C in FIG. 8.
Figure 11:
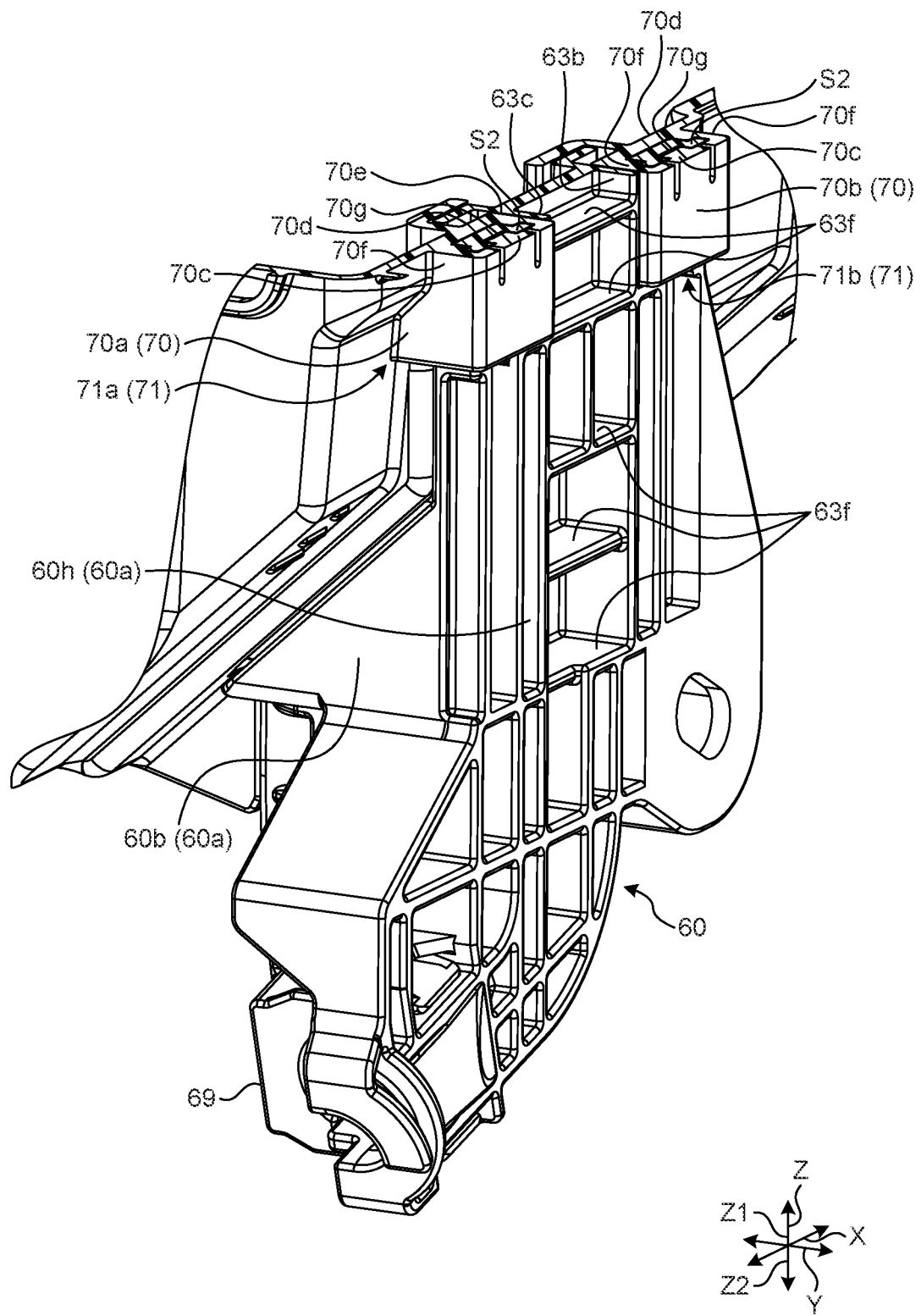
FIG. 11 is a perspective view in a state in which a part of the cover member and a part of the base body are cut while the cover member is being attached to the base body.
Figure 12:
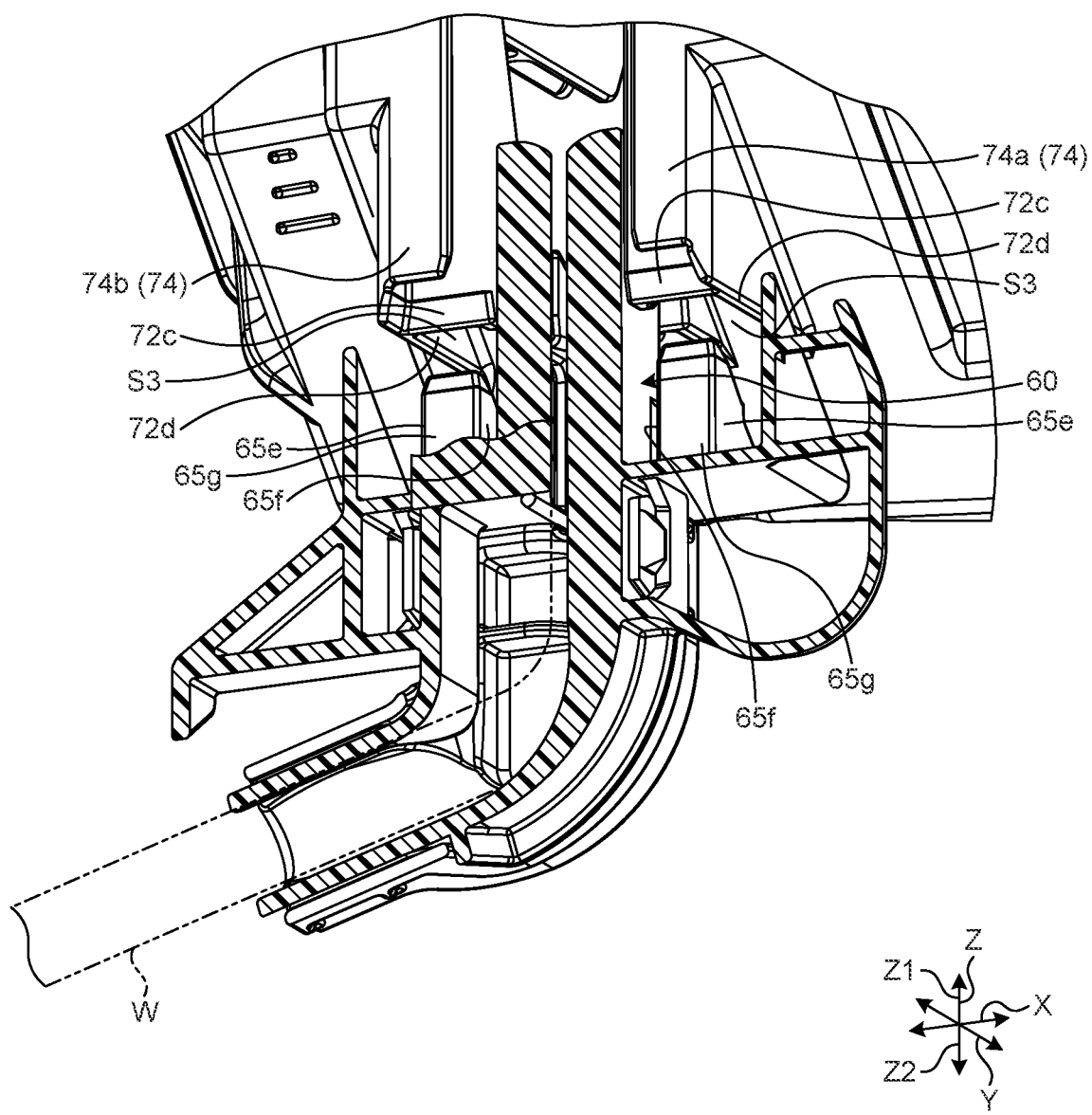
FIG. 12 is a perspective view in a state in which a part of the cover member is cut while the cover member is being attached to the base body.
Figure 13:
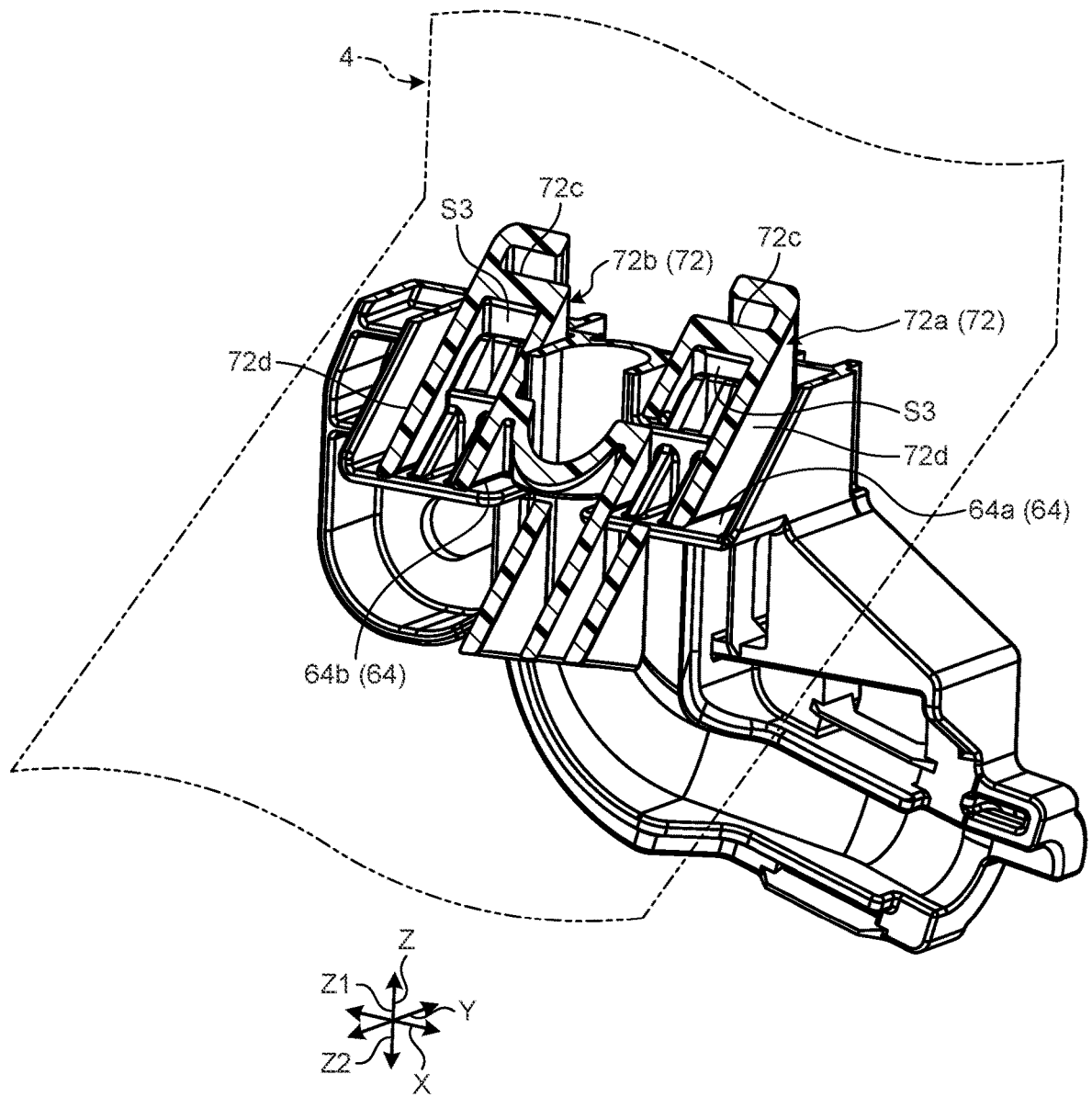
FIG. 13 is a perspective view in a state in which a part of the base body on the outer side of the base body is cut while the cover member is being attached to the base body.

FIG. 1 is a perspective view illustrating the electrical connection box 1 according to the embodiment. FIG. 2 is a plan view illustrating the electrical connection box 1 according to the embodiment. FIG. 3 is a plan view illustrating a casing main body 3 of the electrical connection box 1 according to the embodiment in a state in which a lid body 5 is removed from the casing main body 3. FIG. 4 is a side view of the electrical connection box 1 according to the embodiment. FIG. 5 is a side view of the electrical connection box 1 according to the embodiment in a state in which a cover member 6 is removed from a base body 4. FIG. 6 is a perspective view of the cover member 6 according to the embodiment. FIG. 7 is a partial sectional view of the cover member 6 according to the embodiment in a state in which a lid part 69 is removed from a cover-member main body 60. FIG. 8 is a sectional view taken along a line A-A in FIG. 4. FIG. 9 is a sectional view taken along a line B-B in FIG. 8. FIG. 10 is a sectional view taken along a line C-C in FIG. 8. FIG. 11 is a perspective view in a state in which a part of the cover member 6 and a part of the base body 4 are cut while the cover member 6 is being attached to the base body 4. FIG. 12 is a perspective view in a state in which a part of the cover member 6 is cut while the cover member 6 is being attached to the base body 4. FIG. 13 is a perspective view in a state in which a part of the base body 4 on the outer side of the base body 4 is cut while the cover member 6 is being attached to the base body 4. In the explanations hereinafter, an arrangement direction X, an orthogonal direction Y, and a top-and-bottom direction Z are orthogonal to each other. Furthermore, the top-and-bottom direction Z includes an upward direction as a fitting direction Z1 and a downward direction as an opposite direction Z2. Furthermore, in a state in which the electrical connection box 1 is loaded on a vehicle and the vehicle is located on a horizontal plane, the arrangement direction X and the orthogonal direction Y are along the horizontal direction. Furthermore, in the state in which the electrical connection box 1 is loaded on a vehicle and the vehicle is located on a horizontal plane, the top-and-bottom direction Z corresponds to the direction along which the vehicle oscillates, which is the stacking direction of the casing main body 3, the bottom body 4, and the lid body 5 to be described later. Each of the directions used in the explanations hereinafter is described as the direction in a state in which each component is assembled mutually and the electrical connection box 1 is loaded on a vehicle, unless otherwise noted.

Embodiment

The electrical connection box 1 according to the embodiment illustrated in FIG. 1, FIG. 2, and FIG. 3 is loaded on a vehicle such as an automobile, and mounted to a wire harness WH1. The wire harness WH1 is used for connecting each of electric devices (not illustrated) loaded on a vehicle, for example, by bundling a plurality of wiring members W used for power supply and signal communication as an assembly component and connecting the wiring members W to each of electronic components D via a connector and the like. The wire harness WH1 includes a wiring member W exhibiting conductivity and the electrical connection box 1 electrically connected to the wiring member W. The wiring member W is formed with a metal rod, an electric wire, an electric wire bundle, or the like. The metal rod is formed by covering the outer side of a conductive bar-like member with an insulating covering part. The electric wire is formed by covering, with an insulating cover part, the outer side of a conductor part (core wire) formed with a plurality of conductive metal wires. The electric wire bundle is formed by bundling the electric wires described above. A part of the wiring member W is indicated with a solid line and the remaining part of the wiring member W is indicated with a virtual line in FIG. 1 and FIG. 2, while the wiring member W is not illustrated in the other drawings. As for the wire harness WH1, the wiring members W are bundled together, and the electrical connection box 1 is electrically connected thereto via a connector or the like provided at a terminal of the bundled wiring members W. In addition to those, the wire harness WH1 may be configured by further including a grommet, a protector, a sheath member, a fixture, and the like.

The electrical connection box 1 collectively houses, inside thereof, electronic components D such as a connector, a fuse, a relay, a capacitor, and an electronic control unit. The electrical connection box 1 is placed in an engine room of a vehicle or the interior of the vehicle, for example. Furthermore, as for the electrical connection box 1, a first power supply P1 and a second power supply P2 (see FIG. 1) are electrically connected to each electronic device loaded inside the vehicle via the wiring members W and the like. The first power supply P1 is one of a battery and an alternator, and the second power supply P2 is the remainder of the battery and the alternator. The electrical connection box 1 distributes the power supplied from the power supplies P1 and P2 to each electronic device inside the vehicle. While the electrical connection box 1 may also be called a junction box, a fuse box, a relay box, or the like in some cases, these are collectively referred to as the electrical connection box 1 in the embodiment. Hereinafter, the configuration of the electrical connection box 1 will be described in detail by referring to each drawing. Specifically, the electrical connection box 1 includes the electronic components D, a casing B, and a block 2.

As illustrated in FIG. 3, the electronic components D are components provided inside the casing B while being mounted to the block 2, and implement various functions. The electronic components D are provided inside a housing space S1, and the wiring member W is electrically connected to each thereof. Examples of the electronic components D may be a capacitor, a relay, a resistance, a transistor, a fuse, a connector, an intelligent power switch (IPS), and a microcomputer.

The block 2 to which the electronic components D are mounted is housed in the housing space S1 formed inside the casing B. As illustrated in FIG. 1, the casing B is configured including the casing main body 3 as a frame, the bottom body 4 as a lower cover, the lid body 5 as an upper cover, the cover member 6, and the like. The casing B is in a three-layer divided structure divided into the casing main body 3, the bottom body 4, and the lid body 5. The casing main body 3, the bottom body 4, and the lid body 5 are formed with a synthetic resin exhibiting an insulating characteristic. In the casing B, the casing main body 3, the bottom body 4, and the lid body 5 are stacked and mutually assembled along a prescribed stack direction (herein, in the top-and-bottom direction Z as an example). With such a configuration, the casing B is formed as a hollow box as a whole in which the casing main body 3, the bottom body 4, and the lid body 5 are combined as a plurality of members. Inside the casing B, a space is formed by the casing main body 3, the bottom body 4, and the lid body 5.

Out of the spaces formed inside the casing B, the housing space S1 is a space for housing the electronic components D. The housing space S1 is formed by the casing main body 3, for example.

In the electrical connection box 1, the wiring member W is routed inside the housing space S1 via an insertion hole F (see FIG. 1) formed in the casing B, for example. Furthermore, in the electrical connection box 1, the block 2 to be described later is provided inside the housing space S1, for example, and the wiring member W is connected to the block 2. Furthermore, the casing B of the embodiment has a plurality of insertion holes F. More specifically, there are the first insertion hole F1 formed in the casing main body 3 and the second insertion hole F2 formed in the bottom body 4. The first insertion hole F1 and the second insertion hole F2 have different opening areas, for example. More specifically, the opening area of the first insertion hole F1 is larger than the opening area of the second insertion hole F2.

The block 2 is configured to be able to have the electronic components D loaded thereon, and mounted to the casing B to be detachable. The block 2 is formed with a synthetic resin exhibiting an insulating characteristic. A plurality of the blocks 2 are provided in the casing B, for example.

The wiring member W and the electronic components D are mounted to the block 2, and the wiring member W is electrically connected to the electronic components D. For example, as for the block 2, a terminal or the like provided at the end of the wiring member W is inserted and fitted to each cavity from one side of the top-and-bottom direction Z (typically the side where the bottom body 4 is located). Meanwhile, as for the block 2, the electronic component D is inserted and fitted to each cavity from the other side of the top-and-bottom direction Z (typically the side where the lid body 5 is located). With such a configuration, each of the electronic components D and each of the wiring members W are electrically connected to each other while being assembled and loaded on the block 2, thereby configuring a required electric circuit.

The casing main body 3 is a main member that forms the casing B. As illustrated in FIG. 4, the casing main body 3 is formed in a frame shape having openings 30a and 30b on two faces opposing to each other in the top-and-bottom direction Z. That is, the casing main body 3 is formed in a frame shape having the openings 30a and 30b. More specifically, the casing main body 3 has the opening 30a opened toward the opposite direction Z2, and the opening 30b opened toward the fitting direction Z1. Such the casing main body 3 has the housing space S1 inside thereof for housing the electronic components D. The bottom body 4 is a tray-like member that closes the opening 30a on the lower side of the casing main body 3 in the top-and-bottom direction Z. That is, the bottom body 4 is stacked in the lower side of the casing main body 3 in the top-and-bottom direction Z to close the opening 30a. The lid body 5 is a lid (cover) member that closes the opening 30b of the casing main body 3 in the upper side of the top-and-bottom direction Z. That is, the lid body 5 is stacked in the upper side of the casing main body 3 in the top-and-bottom direction Z to close the opening 30b. As for the casing B, the opening 30a of the casing main body 3 is positioned to oppose to the bottom body 4, and the other opening 30b of the casing main body 3 is positioned to oppose to the lid body 5. As for the casing B in this positional relation, the bottom body 4 is mounted on the lower side of the casing main body 3 in the top-and-bottom direction Z, and the lid body 5 is mounted on the upper side of the casing main body 3 in the top-and-bottom direction Z. As illustrated in FIG. 1 and FIG. 2, the casing B includes various types of locking mechanisms 35, and the bottom body 4 and the lid body 5 are engaged with the casing main body 3 via the locking mechanisms 35. With such a configuration, the casing B is formed in a box shape as a whole.

The casing main body 3 includes a casing outer peripheral wall 31 formed in a lid shape, and it is formed in a frame shape with a plurality of the casing outer peripheral walls 31.

The bottom body 4 includes a tray-like bottom plate part 40 and a bottom-body outer peripheral wall 41 formed in a plate shape, and it is formed with a plurality of the bottom-body outer peripheral walls 41.

The lid body 5 includes a lid-shaped top plate part 50 and a lid-body outer peripheral wall 51 formed in a plate shape, and it is formed with a plurality of the lid-body outer peripheral walls 51.

As illustrated in FIG. 6, the cover member 6 includes a cover-member main body 60, a wiring member holding part 61, a locking piece 62, a restriction piece 63, a plate part 64, a rigid part 65, and the lid part 69, and it is formed with a synthetic resin exhibiting an insulating characteristic, for example. The cover member 6 according to the embodiment closes the insertion hole F2 (see FIG. 5) formed in the bottom body 4, and attached to the side face of the bottom body 4. Such a cover member 6 projects from the bottom body 4 toward the downward direction that is the opposite direction Z2.

The cover-member main body 60 is the main member for forming the cover member 6. As illustrated in FIG. 6 and FIG. 7, the cover-member main body 60 according to the embodiment is formed in a substantially triangular shape with a plurality of main-body plate parts 60a, for example, when viewed from the arrangement direction X. The main-body plate part 60a includes a pair of main-body opposing plate parts 60b and 60c, a pair of main-body first projecting plate parts 60d and 60e, a pair of main-body second projecting plate parts 60f and 60g, a pair of main-body connection plate parts 60h and 60i (see FIG. 11), and a pair of main-body third projecting plate parts 60m and 60n, for example. The pair of main-body opposing plate parts 60b and 60c are substantially triangular plate members that are opposing to each other in the arrangement direction X. The pair of main-body first projecting plate parts 60d and 60e project toward the direction approaching with each other from the ends of the pair of main-body opposing plate parts 60b and 60c between the pair of main-body opposing plate parts 60b and 60c. The pair of main-body second projecting plate parts 60f and 60g project from the wiring member holding part 61 toward the direction isolating from each other in the arrangement direction X. The pair of main-body second projecting plate parts 60f and 60g are adjacent to the wiring member holding part 61 compared to the pair of main-body first projecting plate parts 60d and 60e in the orthogonal direction Y. Out of the pair of main-body connection plate parts 60h and 60i, the main-body connection plate part 60h connects the main-body first projecting plate parts 60d out of the pair of main-body first projecting plate parts 60d and 60e with the main-body second projecting plate part 60f out of the pair of main-body second projecting plate parts 60f and 60g. Out of the pair of main-body connection plate parts 60h and 60i, the other main-body connection plate part 60i connects the other main-body first projecting plate part 60e out of the pair of main-body first projecting plate parts 60d and 60e with the main-body second projecting plate part 60g out of the pair of main-body second projecting plate parts 60f and 60g. The pair of main-body third projecting plate parts 60m and 60n project from the parts 60j and 60k positioned at the tip side of the pair of main-body first projecting plate parts 60d and 60e in the fitting direction Z1 toward the direction isolated with respect to the bottom body 4.

The wiring member holding part 61 holds the wiring members W that are electrically connected to the electronic components D. The wiring member holding part 61 is located in the center of the cover member 6 in the arrangement direction X. Furthermore, one end 61a of the wiring member holding part 61 on the side adjacent to the insertion hole F2 side is extended in the fitting direction Z1, and the other end 61b on the side isolated from the insertion hole F2 side is bent in the arrangement direction X and extended by being tilted with respect to the arrangement direction X and the opposite direction Z2.

The locking piece 62 is extended from the cover-member main body 60 toward the fitting direction Z1. In the electrical connection box 1 according to the embodiment, a pair of locking pieces 62a and 62b are provided to the cover-member main body 60 by sandwiching the wiring member holding part 61 in the arrangement direction X. More specifically, the pair of locking pieces 62a and 62b project from the pair of main-body third projecting plate parts 60m and 60n toward the fitting direction Z1. As for the pair of locking pieces 62a and 62b, the locking piece 62a and the other locking piece 62b are isolated from each other in the arrangement direction X. As illustrated in FIG. 7, each of the locking pieces 62 includes a locking-piece center wall part 62c, a pair of locking-piece sidewall parts 62d and 62e, a locking recessed part 62f, and a locking closing part 62g (see FIG. 8). The locking-piece center wall part 62c is a part formed in a plate-like shape, and it is a main member for forming each of the locking pieces 62. The pair of locking-piece sidewall parts 62d and 62e are parts projecting from both sides of the locking-piece center wall part 62c in the arrangement direction X toward the directions isolated from each other. The locking recessed part 62f is disposed to oppose to the locking-piece center wall part 62c in the orthogonal direction Y between the pair of locking-piece sidewall parts 62d and 62e in the arrangement direction X. Such a locking recessed part 62f is formed on an opposite face that is a face opposing to the bottom body 4 in the locking-piece center wall part 62c. The locking closing part 62g is a part located on the tip side of the locking recessed part 62f in the fixing direction Z1 of each of the locking pieces 62 for closing the locking recessed part 62f. As for the pair of locking pieces 62 with such a configuration, a locking claw 70g to be described later formed in the bottom body 4 is inserted into the locking recessed part 62f and the locking claw 70g comes in contact with the locking closing part 62g, so that the locking claw 70g is engaged with the locking recessed part 62f.

The restriction piece 63 is extended from the cover-member main body 60 toward the fitting direction Z1, and placed along the arrangement direction X with respect to the locking piece 62. More specifically, the restriction piece 63 is located between the locking piece 62 and the other locking piece 62 out of the pair of locking pieces 62a and 62b in the arrangement direction X. In a sectional view orthogonal to the fitting direction Z1, the restriction piece 63 according to the embodiment is formed substantially in an H-like shape with a restriction-piece center wall part 63a extended in the arrangement direction X and restriction-piece sidewall parts 63b and 63c projecting from both ends of the restriction-piece center wall part 63a toward both sides of the orthogonal directions Y. Furthermore, the restriction piece 63 according to the embodiment further includes a pair of guide pieces 63d and 63e and a plurality of restriction-piece ribs 63f. The pair of guide pieces 63d and 63e project toward the directions isolated from each other from the ends of the restriction-piece sidewall parts 63b and 63c adjacent to the bottom body 4 in the orthogonal direction Y. The restriction-piece ribs 63f are disposed with a space provided therebetween in the fitting direction Z1. Each of the restriction-piece ribs 63f is formed in a plate-like shape and, in the arrangement direction X, connects one of the pair of restriction-piece sidewall parts 63b and 63c with the other one of the restriction-piece sidewall parts 63b and 63c.

The plate part 64 is located in the midway in the fitting direction Z1 of the cover-member main body 60. The plate part 64 is formed in a substantially rectangular plate shape. As for the plate part 64 according to the embodiment, a pair thereof are provided between the pair of main-body opposing plate parts 60b and 60c in the arrangement direction X. As for the pair of plate parts 64a and 64b, the plate part 64a and the other plate part 64b are disposed by sandwiching the wiring member holding part 61 in the arrangement direction X. Furthermore, as illustrated in FIG. 6, each of the plate parts 64 according to the embodiment connects the main-body opposing plate parts 60b and 60c, the wiring member holding part 61, and the main-body second projecting plate parts 60f and 60g.

The rigid part 65 projects from the plate part 64 toward the fitting direction Z1, and is extended in the orthogonal direction Y by being disposed with a space provided with respect to the cover-member main body 60 in the orthogonal direction Y. More specifically, the rigid part 65 is formed in a wedge shape in which a part 65c neighboring to the plate part is the thickest and becomes thinner toward the tip side (the side where a tip part 65d is located) that is inserted to a rigid reception part 72. As for the rigid part 65 according to the embodiment, a pair thereof are provided to the cover-member main body 60. Furthermore, the pair of rigid parts 65a and 65b are disposed by sandwiching the wiring member holding part 61 in the arrangement direction X. Each of the rigid parts 65 includes a pair of substantially triangular rigid flat-plate parts 65e and, 65f disposed with a space provided therebetween in the arrangement direction X, for example, and a rectangular flat-plate shaped rigid connection flat plate part 65g that connects the pair of rigid flat-plate parts 65e and 65f.

As illustrated in FIG. 6, the lid part 69 includes a cover locking mechanism 69a that can be engaged with the cover-member main body 60. First, after disposing the cover-member main body 60 and the lid part 69 by being isolated from each other and inserting the wiring member W in the wiring member holding part 61 of the cover-member main body 60, the cover-member main body 60 and the lid part 69 are opposed to each other in the orthogonal direction Y as illustrated in FIG. 7. Thereafter, the lid part 69 is brought to be adjacent to the cover-member main body 60, and the cover locking mechanism 69a is engaged thereto to attach the lid part 69 to the cover-member main body 60. The cover member 6 is formed in the manner described above, and the wiring member W is held by the cover member 6. Thereafter, the operator inserts the tip part of the wiring members W from the insertion hole F2 and attaches the tip part of the wiring member W to the block 2, and then attaches the cover member 6 the bottom body 4.

As illustrated in FIG. 11 and FIG. 13, the bottom body 4 includes a pair of restriction reception parts 70a and 70b, a pair of locking reception parts 71a and 71b, a pair of rigid reception parts 72a and 72b, and a pair of guide reception parts 73a and 73b. More specifically, the bottom body 4 includes, on an outer side of the casing B located on the opposite side of the housing space S1 inside the casing B, the pair of restriction reception parts 70a and 70b, the pair of locking reception parts 71a and 71b, the pair of rigid reception parts 72a and 72b, and the pair of guide reception parts 73a and 73b.

As illustrated in FIG. 5, the pair of restriction reception parts 70a and 70b oppose to each other in the arrangement direction X in a state before the cover member 6 is fitted to the casing B. Furthermore, the pair of restriction reception parts 70a and 70b oppose to the pair of restriction-piece sidewall parts 63b and 63c of the restriction piece 63, respectively, in a state in which the cover member 6 is fitted to the bottom body 4. Each of the restriction reception parts 70 according to the embodiment is formed in a substantially quadrangular cylindrical shape in terms of the sectional view in the direction orthogonal to the fitting direction Z1. More specifically, each of the restriction reception parts 70 is formed to have, inside thereof, a locking-reception-part forming space S2 mainly with four restriction-reception-part forming wall parts 70c, 70d, 70e, and 70f. Furthermore, in each of the restriction reception parts 70, in the orthogonal direction Y, the restriction-reception-part forming wall part 70c disposed on the side isolated from the bottom body 4 includes the locking claw 70g that is inserted into the locking recessed part 62f. The locking claw 70g is formed in the restriction-reception-part forming wall part 70c by projecting toward the locking-reception-part forming space S2. The pair of restriction-piece sidewall parts 63b and 63c and the pair of restriction reception parts 70a and 70b according to the embodiment have a gap in the arrangement direction X in an extent with which the restriction piece 63 can be inserted between the pair of restriction reception parts 70a and 70b, and the pair of restriction-piece sidewall parts 63b and 63c contact with the pair of restriction reception parts 70a and 70b by being slightly deformed when an external force is applied to the cover member 6.

To each locking reception part 71 of the pair of locking reception parts 71a and 71b, the locking piece 62 is inserted. In the electrical connection box 1 according to the embodiment, a pair of the locking pieces 62 are provided to the cover member 6 to sandwich the restriction piece 63 in the arrangement direction X, a pair of the locking reception parts 71 are provided to the bottom body 4, and the pair of restriction reception parts 70a and 70b are the pair of locking reception parts 71a and 71b. More specifically, each of the locking pieces 62 is inserted into the locking-reception-part forming space S2 inside the restriction reception part 70 described above. The locking piece 62 and the locking reception part 71 according to the embodiment have a cap in an extent with which the locking piece 62 can be inserted into the inside of the locking-reception-part forming space 32 of the locking reception part 71, and the locking piece 62 contacts with the inner face of the wall parts configuring the locking-reception-part forming space S2 by being slightly deformed when an external force is applied to the cover member 6.

To the rigid reception part 72 configuring the pair of rigid reception parts 72a and 72b, each of the rigid parts 65 is inserted in a state in which the cover member 6 is fitted to the bottom body 4. In the electrical connection box 1 according to the embodiment, the pair of rigid reception parts 72a and 72b are provided to the bottom body 4 by being isolated from each other in the arrangement direction X. Each of the rigid reception parts 72 includes a rigid-reception-part projecting wall part 72c projecting from the bottom body 4 toward the opposite direction Z2, and a rigid-reception-part connection wall part 72d that is extended at least to one side of the orthogonal direction Y from the end of the rigid-reception-part projecting wall part 72c in the arrangement direction X and connected to the bottom body 4. The rigid-reception-part projecting wall part 72c and the rigid-reception-part connection wall part 72d form, in a wedge shape, a rigid-reception-part space (space) S3 to which the rigid part 65 is inserted. The rigid part 65 and the rigid reception part 72 according to the embodiment have a gap in an extent with which the rigid part 65 can be inserted into the inside of the rigid-reception-part space S3 of the rigid reception part 72, and the rigid part 65 contacts with the inner face of the wall parts configuring the rigid-reception-part space S3 by being slightly deformed when an external force is applied to the cover member 6.

To the pair of guide reception parts 73a and 73b, the pair of guide pieces 63d and 63e are inserted, respectively. The pair of guide reception parts 73a and 73b are formed by being extended along the fitting direction Z1. The pair of guide pieces 63d and 63e and the pair of guide reception parts 73a and 73b according to the embodiment have a gap in an extent with which the pair of guide pieces 63d and 63e can be inserted into the pair of guide reception parts 73a and 73b, and the pair of guide pieces 63d and 63e contact with the pair of guide reception parts 73a and 73b by being slightly deformed when an external force is applied to the cover member 6.

Next, assembling of the electrical connection box 1 will be described. In the electrical connection box 1, the terminal and the like of the wiring member W are inserted and fitted to each cavity of each block 2. Thereby, in the electrical connection box 1, the wiring member W is mounted to each of the blocks 2. Then, in the electrical connection box 1, each of the blocks 2 is fitted and engaged in each of the fitting spaces of the casing main body 3 while inserting the wiring member W into the insertion holes F1 and F2. In this case, each of the blocks 2 is fitted and engaged in each of the fitting spaces from one side (typically the side where the bottom body 4 is located) of the top-and-bottom direction Z. Thereby, in the electrical connection box 1, each of the blocks 2 is mounted to the casing main body 3, and housed inside the housing space S1. Then, in the electrical connection box 1, the bottom body 4 is mounted to the casing main body 3 from one side of the top-and-bottom direction Z.

Furthermore, in the electrical connection box 1, each of the electronic components D is mounted to each of the loading spaces from the other side (typically the side where the lid body 5 is located) of the top-and-bottom direction Z, and each of the electronic components D is mounted to each of the blocks 2. Then, in the electrical connection box 1, the lid body 5 is mounted to the casing main body 3 from the other side of the top-and-bottom direction Z.

Next, a case of attaching such a cover member 6 to the bottom body 4 will be described. First, the operator places the cover member 6 under the bottom body 4. Then, when the operator moves the cover member 6 toward the upper side from the lower side, the pair of guide pieces 63d and 63e are inserted into the pair of guide reception parts 74a and 74b. In a state in which the pair of guide pieces 63d and 63e are inserted into the pair of guide reception parts 74a and 74b, the cover member 6 is restricted from moving in the arrangement direction X and in the orthogonal direction Y while being allowed to move in the top-and-bottom direction Z. When the operator moves the cover member 6 to the fitting direction Z1 of the top-and-bottom direction Z so as to move the cover member 6 with respect to the bottom body 4, the pair of restriction reception parts 70a and 70b come to oppose to the ends of the restriction piece 63 in the arrangement direction X, respectively, and each of the locking pieces 62 is inserted into the locking-reception-part forming space S2 of each of the restriction reception parts 70. Furthermore, when the operator moves the cover member 6 further to the fitting direction Z1, the pair of rigid reception parts 72a and 72b are inserted into the rigid part 65. Thereafter, when the operator moves the cover member 6 further to the fitting direction Z1, the locking claw 70g is inserted into the locking recessed part 62f and the locking claw 70g contacts with the locking closing part 62g. Thereby, the locking claw 70g is engaged with the locking recessed part 62f, so that attachment of the cover member 6 to the bottom body 4 is completed. Thereby, assembly of the electrical connection box 1 is completed.

In the electrical connection box 1 described above, the electronic components D and the wiring members W are electrically connected via a bus bar and the like formed by metal, and the bus bar and the like are housed inside thereof so that the electrical connection box 1 forms a heavy load. When loading the assembled electrical connection box 1 on a vehicle, the electrical connection box 1 is transported. At the time of transportation, the volume of the electrical connection box 1 on the fitting direction Z1 side, more specifically, the upper side including the casing main body 3, the bottom body 4, and the lid body 5 is large, while the volume of the opposite direction Z2 side thereof, more specifically, the lower side including the cover member 6 is extremely small. However, since the cover member 6 projects from the bottom body 4 toward the opposite direction Z2 side, a foreign object may contact with the cover member 6 at the time of transportation. Furthermore, when loading the electrical connection box 1 to a vehicle, the cover member 6 may contact with other components inside the vehicle. As for a conventional electrical connection box, when the cover member projects from the bottom body, the cover member may be excessively deformed because a large force may be applied to the cover member.

In the meantime, the electrical connection box 1 according to the embodiment has a following configuration. The cover member 6 includes: the cover-member main body 60; the restriction pieces 63 arranged along the arrangement direction X with respect to the pair of locking pieces 62a and 62b; and the rigid parts 65 disposed with a space provided with respect to the cover-member main body 60 in the orthogonal direction Y and extended in the orthogonal direction Y. The casing B includes: the pair of restriction reception parts 70a and 70b opposing to the corresponding ends of the pair of restriction pieces 63 in the arrangement direction X in a state in which the cover member 6 is fitted to the casing B; and the rigid reception part 72 having the rigid-reception-part projecting wall part 72c located between the rigid part 65 and the cover-member main body 60 in a state in which the rigid part 65 is inserted and the cover member 6 is fitted to the casing B. Therefore, even if a large force is applied to the cover member 6 from the arrangement direction X because of an external force working on the cover member 6 from the arrangement direction X, the electrical connection box 1 according to the embodiment can receive the force with the restriction piece 63 and the restriction reception part 70. In addition, even if a large force is applied to the cover member 6 from the orthogonal direction Y because of an external force working on the cover member 6 from the orthogonal direction Y, the electrical connection box 1 according to the embodiment can receive the force with the rigid part 65 and the rigid reception part 72. As a result, the electrical connection box 1 according to the embodiment is capable of suppressing excessive deformation caused in a part of the cover member 6.

The electrical connection box 1 according to the embodiment has a following configuration. The cover member 6 projects from the bottom body 4 toward the opposite direction Z2 of the fitting direction Z1. Thus, with the electrical connection box 1 according to the embodiment, the risk of having a contact of foreign object with the cover member 6 is increased. However, since the electrical connection box 1 according to the embodiment has the configuration described above, it is possible to suppress excessive deformation of a part of the cover member 6 even if a foreign object comes in contact with the cover member 6.

The electrical connection box 1 according to the embodiment has a following configuration. As for the locking piece 62, a pair thereof are provided to the cover member 6 to sandwich the restriction piece 63 in the arrangement direction X. The pair of restriction reception parts 70a and 70b are the pair of locking reception parts 71. Therefore, the electrical connection box 1 according to the embodiment is capable of simplifying the configuration, and it is unnecessary to separately provide the locking reception parts anew.

The electrical connection box 1 according to the embodiment has a following configuration. The cover-member main body 60 includes the pair of rigid parts 65 sandwiching the wiring member holding part 61 in the arrangement direction X. The casing B includes, in a state in which the cover member 6 is being fitted, the pair of rigid reception parts 72a and 72b sandwiching the wiring member holding part 61 in the arrangement direction X. Thus, the electrical connection box 1 according to the embodiment includes: on one side of the wiring member holding part 61 in the arrangement direction X, the rigid part 65 and the rigid reception part 72 to which the rigid part 65 is inserted and on the other side of the wiring member holding part 61, the rigid part 65 and the rigid reception part 72 to which the rigid part 65 is inserted. As a result, with the electrical connection box 1 according to the embodiment, it is possible to suppress a large force applied to the wiring member holding part 61 with the pair of rigid parts 65 and the pair of rigid reception parts 72a and 72b.

The electrical connection box 1 according to the embodiment has a following configuration. The cover member 6 includes the pair of locking pieces 62a and 62b, and the restriction piece 63 located between the pair of locking pieces 62a and 62b. The casing B includes: the pair of locking reception parts 71a and 71b to which the pair of locking pieces 62a and 62b are inserted, respectively; and the pair of restriction parts opposing to respective ends of the restriction piece 63 in the arrangement direction X in a state in which the cover member 6 is fitted to the casing B. In the electrical connection box 1 according to the embodiment, the number of the locking pieces 62 and the locking reception parts 71 is reduced as much as possible, so that the force for inserting the cover member 6 for the casing B can be reduced. Thereby, with the electrical connection box 1 according to the embodiment, it is possible to improve the workability by making it easy to do the work for fitting the cover member 6 to the casing B.

Note that the electrical connection box 1 according to the embodiment is not limited to the embodiment described above, but various changes are possible within the scope of the appended claims. For example, in the embodiment above, the casing B is described to include the casing main body 3, the bottom body 4, and the lid body 5. However, the present invention is not limited thereto, but the casing B may be configured with a bottom body together with an integrally formed casing main body and lid body.

Furthermore, in the embodiment above, the cover-member main body 60 is described to include the pair of locking pieces 62a and 62b. However, the embodiment is not limited thereto, but the cover-member main body 60 may include a single locking piece 62. Naturally, the embodiment is not limited thereto, but the cover-member main body 60 may include three or more locking pieces 62.

Furthermore, the bottom body 4 in the embodiment above is described to have, on the outer side of the casing B, the pair of locking reception parts 71a and 71b, the pair of rigid reception parts 72a and 72b, and the pair of guide reception parts 73a and 73b. However, the embodiment is not limited thereto, but the bottom body 4 may include a single locking reception part 71, a single rigid reception part 72, and a single guide reception part 73.

Furthermore, in the embodiment above, it is described that the cover member 6 is provides to the bottom body 4. However, the present invention is not limited thereto, but the cover member 6 may be provided to the lid body 5 or the cover member 6 may be provided to the casing main body 3.

Furthermore, in the embodiment above, the rigid part 65 is described to be formed in a wedge shape with four flat plate parts. However, the present invention is not limited thereto, but the rigid part 65 may be formed solidly, formed in a polygonal columnar shape different from the wedge shape, or may be formed in a polygonal pyramid shape, a cylindrical shape, or a conic shape.

Furthermore, in the embodiment described above, the restriction piece 63 is described to be formed in substantially a H-like shape in the sectional view orthogonal to the fitting direction Z1, by including the restriction-piece center wall part 63a extended in the arrangement direction X and the pair of restriction-piece sidewall parts 63b and 63c projecting from both ends of the restriction-piece center wall part 63a toward both sides of the orthogonal direction Y. However, the present invention is not limited thereto, but the restriction piece 63 may include, in the sectional view orthogonal to the fitting direction Z1, the restriction-piece center wall part 63a extended in the arrangement direction X and a pair of restriction-piece one-side wall parts projecting from both ends of the restriction-piece center wall part 63a toward at least one side of the orthogonal direction Y.

The electrical connection box according to the present embodiment has a following configuration. The cover member includes: the cover-member main body; the restriction piece arranged along the arrangement direction with respect to the pair of locking pieces; and the rigid part that is disposed with a space provided with respect to the cover-member main body in the orthogonal direction and extended in the orthogonal direction. The casing includes: the pair of restriction reception parts opposing to respective ends in the arrangement direction of the pair of restriction pieces in a state in which the cover member is fitted to the casing; and the rigid reception part having the rigid-reception-part projecting wall part located between the rigid part and the cover-member main body in a state in which the rigid part is inserted and the cover member is fitted to the casing. As a result, the electrical connection box according to the present embodiment is capable of suppressing excessive deformation caused in a part of the cover member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:
 a casing having a housing space inside for housing an electronic component; and
 a cover member that includes a wiring member holding part for holding a wiring member electrically connected to the electronic component, the cover member being fitted to the casing by being moved to a fitting direction with respect to the casing, wherein
 the cover member includes:
  a cover-member main body;
  at least one locking piece extended from the cover-member main body toward the fitting direction;
  a restriction piece that is extended from the cover-member main body toward the fitting direction, and is arranged along the locking piece in an arrangement direction orthogonal to the fitting direction;
  a plate part located in a midway of the fitting direction of the cover-member main body; and
  a rigid part that projects from the plate part toward the fitting direction, is disposed with a space provided with respect to the cover-member main body in an orthogonal direction orthogonal to each of the fitting direction and the arrangement direction, and is extended in the orthogonal direction,
 the casing includes:
  an insertion hole to which the wiring member is inserted;
  a locking reception part to which the locking piece is inserted;
  a pair of restriction reception parts that oppose to respective ends in the arrangement direction of a pair of the restriction pieces in a state in which the cover member is fitted to the casing; and
  a rigid reception part having a rigid-reception-part projecting wall part located between the rigid part and the cover-member main body in a state in which the rigid part is inserted and projects from the casing toward an opposite direction of the fitting direction, and the cover member is fitted to the casing.

2. The electrical connection box according to claim 1, wherein
the rigid part is formed in a wedge shape in which a part neighboring to the plate part is thickest and becomes thinner toward a tip side that is inserted into the rigid reception part, and
in the rigid reception part, a space part to which the rigid part is inserted is formed in a wedge shape.

3. The electrical connection box according to claim 2, wherein
the casing includes:
a casing main body having an opening opened toward a downward direction that is an opposite direction of the fitting direction; and a bottom body that closes the opening, and
the cover member projects from the bottom body toward the downward direction.

4. The electrical connection box according to claim 3, wherein
a pair of the locking pieces are provided to the cover member to sandwich the restriction piece in the arrangement direction,
a pair of the locking reception parts are provided to the casing, and
the pair of restriction reception parts are the pair of locking reception parts.

5. The electrical connection box according to claim 4, wherein
the cover-member main body includes a pair of the rigid parts sandwiching the wiring member holding part in the arrangement direction, and
the casing includes a pair of the rigid reception parts sandwiching the wiring member holding part in a state in which the cover member is fitted.

6. The electrical connection box according to claim 3, wherein
the cover-member main body includes a pair of the rigid parts sandwiching the wiring member holding part in the arrangement direction, and
the casing includes a pair of the rigid reception parts sandwiching the wiring member holding part in a state in which the cover member is fitted.

7. The electrical connection box according to claim 2, wherein
a pair of the locking pieces are provided to the cover member to sandwich the restriction piece in the arrangement direction,
a pair of the locking reception parts are provided to the casing, and
the pair of restriction reception parts are the pair of locking reception parts.

8. The electrical connection box according to claim 7, wherein
the cover-member main body includes a pair of the rigid parts sandwiching the wiring member holding part in the arrangement direction, and
the casing includes a pair of the rigid reception parts sandwiching the wiring member holding part in a state in which the cover member is fitted.

9. The electrical connection box according to claim 2, wherein
the cover-member main body includes a pair of the rigid pasts sandwiching the wiring member holding part in the arrangement direction, and
the casing includes a pair of the rigid reception parts sandwiching the wiring member holding part in a state in which the cover member is fitted.

10. The electrical connection box according to claim 1, wherein
the casing includes:
a casing main body having an opening opened toward a downward direction that is an opposite direction of the fitting direction; and a bottom body that closes the opening, and
the cover member projects from the bottom body toward the downward direction.

11. The electrical connection box according to claim 10, wherein
a pair of the locking pieces are provided to the cover member to sandwich the restriction piece in the arrangement direction,
a pair of the locking reception parts are provided to the casing, and
the pair of restriction reception parts are the pair of locking reception parts.

12. The electrical connection box according to claim 11, wherein
the cover-member main body includes a pair of the rigid parts sandwiching the wiring member holding part in the arrangement direction, and
the casing includes a pair of the rigid reception parts sandwiching the wiring member holding part in a state in which the cover member is fitted.

13. The electrical connection box according to claim 10, wherein
the cover-member main body includes a pair of the rigid parts sandwiching the wiring member holding part in the arrangement direction, and
the casing includes a pair of the rigid reception parts sandwiching the wiring member holding part in a state in which the cover member is fitted.

14. The electrical connection box according to claim 1, wherein
a pair of the locking pieces are provided to the cover member to sandwich the restriction piece in the arrangement direction,
a pair of the locking reception parts are provided to the casing, and
the pair of restriction reception parts are the pair of locking reception parts.

15. The electrical connection box according to claim 14, wherein
the cover-member main body includes a pair of the rigid parts sandwiching the wiring member holding part in the arrangement direction, and
the casing includes a pair of the rigid reception parts sandwiching the wiring member holding part in a state in which the cover member is fitted.

16. The electrical connection box according to claim 1, wherein
the cover-member main body includes a pair of the rigid parts sandwiching the wiring member holding part in the arrangement direction, and
the casing includes a pair of the rigid reception parts sandwiching the wiring member holding part in a state in which the cover member is fitted.

\* \* \* \* \*